United States Patent [19]
Clark et al.

[11] Patent Number: 5,234,969
[45] Date of Patent: Aug. 10, 1993

[54] CURED PHENOLIC FOAMS

[75] Inventors: Robert C. Clark, Somers, Conn.; Dean L. Kavanagh, Longmeadow, Mass.

[73] Assignee: Monsanto Company, St. Louis, Mo.

[21] Appl. No.: 985,258

[22] Filed: Dec. 3, 1992

Related U.S. Application Data

[63] Continuation of Ser. No. 925,524, Oct. 28, 1986, which is a continuation of Ser. No. 571,885, Jan. 18, 1984, which is a continuation of Ser. No. 520,364, Aug. 4, 1983, abandoned, which is a continuation-in-part of Ser. No. 265,277, May 20, 1981, abandoned.

[51] Int. Cl.$^5$ .............................................. C08J 9/36
[52] U.S. Cl. .................................. 521/181; 264/157; 521/918
[58] Field of Search ................. 264/157; 521/181, 918

Primary Examiner—Morton Foelak
Attorney, Agent, or Firm—Banner, Birch, McKie & Beckett

[57] ABSTRACT

Dimensionally stable, cured phenolic foams are described that have a thermal conductivity after 10-days below 0.0185 watts/m °C., a density of 30 to 70 kg/cubic meter and a closed-cell content of at least 85%.

4 Claims, No Drawings

CURED PHENOLIC FOAMS

This application is a continuation of application Ser. No. 06/925,524 filed Oct. 28, 1986 which is a continuation of Ser. No. 06/571,885 filed Jan. 18, 1984; which is a continuation of Ser. No. 06/520,364 filed Aug. 4, 1983, now abandoned, which is a continuation-in-part of Ser. No. 06/265,277 filed May 20, 1981, now abandoned.

CROSS REFERENCE TO RELATED APPLICATIONS

1. "Phenolic Foams", Robert C. Clark et al, U.S. Ser. No. 265,508, filed May 20, 1981.

BACKGROUND OF THE INVENTION

This invention relates to phenolic foams and particularly to closed-cell foams of a phenol/formaldehyde resin with a high degree of cure.

The use of foam materials as insulation is an already well-established expedient. However many foam materials that are currently in use have certain inherent problems such as flammability or the production of noxious gases on partial combustion. For this reason there have been a number of attempts to develop a foam with an inbuilt resistance to burning and at the same time high insulation value.

One of the resins explored as having the desired characteristics for producing a flame-resistant foam is a phenolic resin by which is meant in the context of this application a resole produced by the base-catalyzed copolymerization of phenol with an excess of formaldehyde.

Unfortunately the problems of producing a phenolic foam are substantial in that, if good thermal conductivity is to be maintained, substantially all the cells must be and remain closed. This is not easy since the reaction of phenol with formaldehyde generates water as a by-product and this can easily blow open the cells and so diminish the value of the foam as a thermal barrier.

DISCUSSION OF THE PRIOR ART

As disclosed in British Patent No. 1,580,565, it is possible to produce a closed-cell phenolic foam by keeping the reaction temperature low so as to avoid vaporizing the by-product water. However this results in foams with a low degree of cure, that is to say an incompletely reacted resin with high residual formaldehyde. Such products also have poor dimensional stability. In conventional phenolic foams those defects cannot be mitigated by heating to increase the degree of reaction, (or cure), because the cell structures are not strong enough to resist the forces to which the foam is exposed during cure.

In the attempt to generate phenolic foams with a fine uniform cell structure it has long been recognized that the viscosity of the resole itself is an important factor. In U.S. Pat. No. 3,389,094 the importance of using a resole with a water content of less than 10% is disclosed, and in U.S. Pat. No. 2,845,396 for low density foams less than 5% water is stressed. Low water content is desirable since the initial resin viscosity is higher. In addition, since curing takes place at elevated temperatures, water released by the cure or already in the foam can vaporize and blow open the cells. It is desirable therefore to minimize the problem by reducing the vaporizable water. In British Patent No. 1,580,565 it is stressed that the temperature should never be allowed to exceed 100° C. so as to avoid blowing open the cell structure.

A good closed-cell foam also needs to be made from a resole with the correct rheological properties to ensure that the cell walls remain essentially intact during foam formation and cure. Methods of adjusting the rheological properties of a resole during foaming by the incorporation of a suitable surfactant are described in U.S. Pat. Nos. 2,933,461; 2,845,396; 3,953,645; 4,140,842 and 4,133,931 the disclosures and teachings of which regarding the use of surfactants are incorporated herein by reference.

Both the viscosity limitation and surfactant usage are reflections of the fact that to achieve adequate closed-cell content it is necessary that the cell walls be strong enough to withstand the stresses encountered when the resin is foamed and subsequently cured. As the cells expand, the cell walls must be able to stretch without rupturing. They must in practice demonstrate the well-known "Marangoni Effect" which is described in detail for example in "Plastic Foams" by Frisch and Saunders (Marcel Decker, Inc. 1972) Part I pp. 31–35. The Effect refers to the tendency of a surfactant-containing resin film, on stretching, to correct any tendency to depletion of the surfactant concentration on the surface of the film by feeding resin and surfactant into the stretched area and thus restore the film thickness. This "self-healing" effect therefore aids in preventing the fracture of cell walls during the foam formation.

It is desirable that the gas filling the closed-cells have a slow a thermal conductivity as possible. Gases which have been found useful as blowing agents include hydrocarbons and halogenated hydrocarbons (U.S. Pat. No. 2,933,461) and fluorcarbons (U.S. Pat. No. 3,389,094).

Phenolic foams, in order to be commercially acceptable need also possess good dimensional stability, by which is meant stability to permanent dimensional change in use. One potential market for such foams is in roofing structures. In such applications foam boards are fixed to a substrate structure and overlaid with layers of hot mopped asphalt felt. Relatively high temperatures are reached during installation such that shrinkage can become a real problem if the foam is insufficiently cured. If a panel one meter in length were to undergo permanent shrinkage of even one-half of one percent during or after installation, this would result in a gap of one-half cm. between adjacent panels and would lead to highly undesirable consequences in loss of integrity, insulation characteristics and perhaps even increase the possibility of leaks. It is therefore very important that a good insulation board have excellent dimensional stability.

This need can be met by conventional phenolic foams but at the cost of generating a predominantly open-cell foam as a result of the stresses attendant upon the curing operation.

Another desirable feature that has not been provided by prior art phenolic foams, except in open-cell foams with poor insulation characteristics, is a low level of releasable formaldehyde in the foam. Environmental considerations dictate that the residual formaldehyde in the foam should be reduced to as low a level as possible. A known technique for doing this is to cure the resin but with prior art foams this leads to a rupture of the cell walls and consequently a drop in the insulation efficiency of the foams.

SUMMARY OF THE INVENTION

Now, however, improvements have been developed to minimize such prior art shortcomings.

Accordingly, it is a principal object of this invention to provide a dimensionally stable phenolic foam that has been cured to such a degree that the problem of residual formaldehyde is very significantly reduced without serious loss in insulation properties.

Another object of this invention is to provide a process capable of producing such aforesaid cured phenolic foam.

The present invention comprises a dimensionally stable, cured phenolic foam derived from a composition comprising a phenolic resole having a formaldehyde to phenol mole ratio of from 1.2:1 to 2.5:1, a surfactant in sufficiently quantity for the resole to exhibit the Marangoni Effect during foaming and a blowing agent having a thermal conductivity less than 0.016 watts/m° C., said foam being characterized in that it possesses a closed-cell content of at least 85%, a density of from 30 to 70 kg/cubic meter and a thermal conductivity after 10 days of less than 0.0185 watts/m° C.

It has been found that phenolic foams are dimensionally stable up to about the highest temperature they have seen during the cure operation. Above that temperature the curing, (i.e. the building of crosslinks) increases and dimensional change may be observed. Thus dimensional stability is an indicator of the degree of cure the foam has received. Generally the foams should exhibit dimensional stability up to as high a temperature as the foam is likely to experience in use. For insulation board applications this will not as a rule exceed 90° C. but preferred foams exhibit this stability up to 100° C. and thus have a good safety margin in use. This dimensional stability, it should be noted, is an inherent property of the foam and not the result of lamination or filling.

Thus the foams of the invention are characterized by their dimensional stability at the elevated temperatures that are often encountered in use. For the purposes of this specification, a foam is considered to be dimensionally stable if a cylindrical sample with a diameter of 3.5 cm. and length of 3.0 cm. which has been cured at 90° C. for two hours exhibits less than 0.1% permanent change in any dimension as measured with a caliper in accordance with Example 1 following herein after being held at 90° C. for an hour.

Temperature equilibrium is only reached after all parts of the foam have reached the same given temperature. Clearly the larger the sample and the better the heat insulation characteristics of the foam, the longer it will take to reach equilibrium. The above test is a useful indicator of dimensional stability because the sample is small and can be considered to have been substantially equilibrated shortly after reached 90° C.

The cured foam of the invention is also characterized by its high closed-cell content of at least 85% and preferably at least 90%. This level of closed-cell content is unusual in a foam that has dimensional stability at elevated temperatures because, as indicated above, elevated temperatures tend to rupture cell walls. However the precursor foams have a unique strength that enables them to withstand the stresses generated during cure. Thus they retain very high closed-cell content and excellent, relatively stable thermal conductivity values even after the curing operation.

Dimensional stability is a function of the degree of cure and this can be followed by observing the molecular structure of the foam. Expressed in simplified form, the first stage of the production of a phenolic resole is the formation of intermediates with the formula:

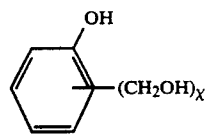

and the ratio of χ/phenolic ring gives the approximate combined F/P ratio for the resin.

These intermediates may then react to give crosslink structures with the following forms:

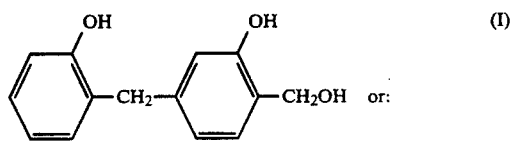

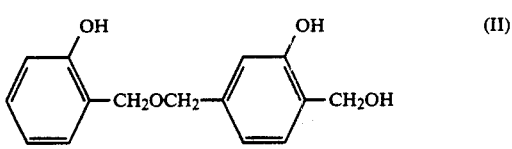

structure II then, at high temperatures, reacting to split off formaldehyde and give the crosslinked structure (I) above. Further reaction leads to chain extension and crosslinking via reaction at other locations on the aromatic ring.

The number of —CH—linking groups per aromatic ring structure gives a good indication of the degree of crosslinking in the resole molecule. This is known as the "Cure Ratio". In general the higher the ratio, the higher the temperature at which the foam has been cured and therefore the higher the temperature at which the foam will retain its dimensional stability.

This ratio can be determined using carbon 13 nuclear magnetic resonance spectroscopy on a sample of the foam. A technique by which cured phenolic resins can be examined in this fashion is described in "Macromolecules" 1980 Vol. 13 pp. 1320–1322 by Fyfe, Rudin and Tchir.

The cure rate is somewhat determined by the mole ratio of formaldehyde to phenol (the F/P ratio) in the resole. This may be a reflection of an inhibiting effect on the cure resulting from water liberated during cure or perhaps the availability of ring hydrogens ortho- and para- to the phenolic hydroxyl group. Whatever the explanation may be, it has been found that the higher the F/P ratio, the longer it takes to reach a given degree of cure. This a resole with an F/P of 2.0/1 needs to be heated for a longer period to obtain a given degree of cure than does a resole with an F/P ratio of 1.6:1, given the same temperature and acid cure catalyst concentration.

The degree of cure is also profoundly affected by the temperature at which the resole is heated. As might be anticipated, higher temperatures result in cures that are not only more advanced but are also more quickly attained. It is preferred that the foams of the invention have been cured for at least an hour at temperatures of about 120° C. or even higher, for example up to 150° C.

since this speeds up the cure operation substantially. It has been found that phenolic foams which fall within the bounds of this invention formed form resoles having an F/P mole ratio of about 2:1 have a cure ratio of about 0.75 to 0.8 whereas those with an F/P mole ratio of about 1.6:1 have a cure ratio of about 1.0. The theoretical maximum cure ratio, at which all possible crosslinks are of the —$CH_2$—variety, is 1.5. The lower value of the cure ratio obtained for the higher F/P ratio appears to reflect the presence of substantial amounts of the —$CH_2$—O—$CH_2$—linking groups described above.

When a phenolic foam is freshly prepared it is fairly soft and tends to be somewhat thermoplastic, reflecting its low degree of cure. The foam is then conventionally allowed to harden, (advancing the cure somewhat under the influence of the reaction exotherm), before being given a low temperature treatment at 60°–75° C. so as to advance the cure a little further.

Generally prior art foams can stand very little by way of heat-cure treatments without cell rupture. It has been found however that partially cured foams which have been exposed to 60° C. for at least about 18 hours which have a burst pressure after such partial curing of at least 1.75 kg/cm$^2$ and a closed-cell content of at least 85% are generally capable of producing dimensionally stable cured foams according to the invention with at least an 85% closed cell content. The "burst pressure" is defined as the lowest isotropic pressure required to reduce the closed-cell content of the foam by at least 10%. It can be measured by subjecting a sample of the foam having a known closed-cell content to a known isotropic pressure for five minutes in a pressure tube and then re-measuring the closed-cell content. This is repeated at ever increasing pressures and a graph is plotted of closed-cell content after the pressure treatment against the pressure to which the foam was subjected. For a partially cured foam with an initial closed-cell content greater than 85%, the graph shows a shallow decline of closed-cell content with increasing pressure until the "burst pressure" is reached, when the closed-cell content falls dramatically by at least 10%. Prior art foams have substantially lower burst pressures than 1.75 kg/cm$^2$.

The most preferred partially cured foams also show a very slow rate of increase of the thermal conductivity with time. This can be expressed as the value (known as k-retention) of the expression $\Delta k/\Delta \ln t$ where $\Delta k$ is $k_{100}-k_1$ and $\Delta \ln t$ is $\ln t_{100} - \ln t_1$ (or $\ln 100 - \ln 1$) where k is the thermal conductivity of a 2.54 cm thick sample measured in watts/m° C. 100 days ($k_{100}$) and one day ($k_1$) after manufacture and t is elapsed time. The preferred partially cured foams that can be used to produce the cured foams of the invention have a k-retention value of not more than $0.5 \times 10^{-3}$. Partially cured foams of this type are disclosed in commonly owned copending application Ser. No. 265,508, filed May 20, 1981. The slow drift of the thermal conductivity and high burst pressure indicates that the partially cured precursor foams have a unique and very advantageous cell structure that permits the foams to be cured to such an extent that they can achieve dimensional stability under conditions that a foam board is likely to experience in use.

DETAILED DESCRIPTION OF THE INVENTION

Foam Composition

The resole from which the foam is made is essentially a conventional phenol/formaldehyde resole preferably with less than 10% by weight of any ring-substituted phenolic components such as cresol, xylenol and the like. The F/P mole ratio of the resole is from 1.2:1 to 2.5:1 though ratios at the higher end of this range are not preferred because the excessive amount of formaldehyde prolongs the cure process. However if too small a ratio is used, complete reaction to form the foam may be difficult to achieve. The most preferred F/P ratios are from 1.5 to 2.2:1. As used herein throughout, F/P ratio means the mole ratio of chemically combined formaldehyde to phenol in the resole. Such ratio can be determined by carbon 13 nuclear magnetic resonance ($^{13}$C-NMR). In a specific technique which has been used, $^{13}$C-NMR quantitative spectra were recorded using a Jeol FX-90Q spectrometer (supplied by Jeol Company, 235 Birchwood Avenue, Cranford, N.J.) at ambient temperature on 50-70% weight percent solutions of resin in methanol solvent. Samples were run in a 10 mm diameter tube with 2% added tetra methyl silane as a chemical shift reference. The spectrometer was equipped with an external lithium 7 isotope lock. The analyzed spectra were the result of 1–5000 accumulations at a tip angle of 90° C. Optimized quantitative conditions were employed with gated decoupling (proton decoupling on only during accumulation) and a pulse delay between accumulations of $>5$ $T_1$ (relaxation time). Integrated spectra were used to calculate combined F/P at an accuracy generally better than 4%.

The density of the foam is from 30 to 70 kg/m$^3$ but preferred foams have densities of from 40 to 60 kg/m$^3$.

The viscosity of the resole measured at room temperature of 25° C. is from about 50,000 to 1,000,000 cps, with the best results obtained at a viscosity of from 80,000 to 600,000 cps and most preferably 80,000 to 300,000 cps. At such viscosities, the resole can be foamed to produce a substantially closed-cell foam using foaming conditions in accordance with the present invention that are relatively easily controlled.

A resole is usually produced by the conventional base-catalyzed reaction using an acid subsequent to the formation of the resole to neutralize the base and stabilize the resin. This of course results in the production of salt by the reaction of acid and base. The resole may be neutralized using sulfuric acid or carbon dioxide to give large insoluble salt particles which can easily be filtered out before the resole is used to produce a foam. It may also be possible to use unfiltered resins if no settling problems are encountered in the foaming process employed. In general, where salt particles are present, it is preferred that they be very large or very small, that is, substantially larger in diameter than that of the cell or smaller than the thickness of the cell wall. If smaller than the cell wall thickness the particle will not adversely affect the window integrity whereas if larger than a cell the number of cells that are disrupted should be low. Resoles in which neutralization produces a soluble salt are usually not employed because of the water-sensitivity such resoles often display in that the insulating properties and dimensional stability of the resulting foam can be adversely affected by ambient humidity. However, resoles containing soluble salts which are not water sensitive, such as a calcium salt of an alkyl or aromatic sulfuric acid, or have low water sensitivity can be used.

A preferred option is the use of the so-called "dispersed-salt" resoles in which the neutralizing acid is oxalic acid and the oxalate salts formed are highly insoluble and in colloidal form with substantially no tendency to settle. These resins and foams made from them are described for example in U.S. Pat. No. 4,060,504 and U.S. Pat. No. 4,216,295.

The composition from which the foam is prepared comprises a surfactant material in an amount sufficient for the resole to exhibit the Marangoni Effect during foaming and thus have the capacity to produce cells with windows, (the membranes between contiguous cells), that remain intact as the cell grows to its final size. The amount of surfactant that can be used varies somewhat with the surfactant but in general it has been observed that closed-cell foams are difficult to achieve with less than 0.5% by weight of surfactant and that over 6.0% by weight produces no advantage and may even be deleterious. The most useful amount of surfactant is found to be from 1 to 5% by weight. All surfactant percentages given are based on the resole weight.

The surfactant can be any one of those that have been shown effective with foamable resoles in the past. These include non-ionic surfactants such as polyethers, polyalcohols, particularly the condensation products of alkylene oxides with alkyl phenols, fatty acids, silanes and silicones, fatty acid esters of polyhydroxyl compounds such as sorbitan or sorbitol, polysilyl phosphonates, polydimethylsiloxane and the capped surfactants described in U.S. Pat. No. 4,133,931; 4,140,842 and 4,247,413, the disclosures of surfactants of which are incorporated herein by reference. Ionic surfactants such as alkylated quaternary ammonium derivaties may also be used.

The presence of the surfactant as indicated above allows the foam/cure operation to proceed reasonably rapidly without cell structure disruption. However excessive speed, as a result for example of the use of resoles of high reactivity, may still casuse disruption to occur. It is advisable therefore to select a resole of moderate reactivity and a foaming catalyst amount that will result in only a moderate exotherm. The combination of resole reactivity and foaming catalyst level can be expressed in terms of a reactivity number defined in Example 7 hereinafter and which can be between about 2 to about 12.

Foaming is catalyzed by an acid and those commonly used include boric acid, sulfuric acid and sulfonic acids such as toluene and xylene sulfonic acids. Other catalytic acids however are known in the art and may be used. The level of catalyst sued in the foaming mixture may very widely depending on the particular resole and catalyst used. Levels between about 0.5 to about 3.0 and preferably between 1.0 to 2.0 weight percent based on the weight of the resole can be used.

The blowing agent used must have a thermal conductivity of less than 0.016 and preferably less than 0.014 watts/m° C. Typically this range includes blowing agents such as methylene dichloride, and various chlorofluorocarbons such as monofluorotrichloromethane, difluorodichloromethane, monofluorodichloromethane, difluoromonochloromethane, trifluorotrichloroethane, and tetrafluorodichloroethane. Freon 114, (1,2 dichlorotetrafluoroethane available from DuPont Company under the above trade designation) is particularly preferred. The level of blowing agent used in the foaming mixture is dependent on the molecular weight of the blowing agent and the foam density. Levels between about 5 to about 25 and preferably between 10 to 20 weight percent for Freon 114 based on the weight of the resole can be used for foams of about 30 to 70 kg/m$^3$.

In addition to the catalyst residues formed in neutralizing the base catalyzing the reaction forming the resole, the resole may comprise latent neutralizing additives to remove traces of residual curing acid and leave a neutral foam. Suitable latent neutralizers are described for example in U.S. Pat. Nos. 4,207,400 and 4,207,401, the disclosures and teachings of latent neutralizers of which are incorporated herein by reference.

In addition to the components described above, the foam can further comprise other additives such as antipunking additives and particulate or fibrous fillers such as glass fibers, talc and the like, to improve the fire safety or physical characteristics of the resulting foam. It may also comprise components added after the resole formation such as lignin materials, urea, or melamine as extenders or formaldehyde scavengers. Hydrated alumina as taught in commonly owned copending U.S. application Ser. No. 219,165 filed Dec. 22, 1980 is effective in increasing the closed-cell content and is therefore a desirable component of the foam.

The Foaming Process

The process by which closed-cell phenolic foams are produced is very sensitive to variations in conditions and formulations. The basic process described in the prior art entails the extrusion of a foamable mixture under such conditions that the resole foams and hardens at compatible rates. However within these broad parameters it has not heretofore proved possible to obtain a foam that has the outstanding performance of the foams of the invention.

In the production of the foams of the invention the components from which the foam is to b made comprise a resole, a surfactant, an acid catalyst and a blowing agent. These components are selected according to the principles outlined above and are mixed at a temperature and pressure calculated to ensure rapid expansion at the extrusion head. The mixing can be carried out in any device capable of giving effective, fine (less than 10 micron) and uniform dispersion of the blowing agent in the mixture. A suitable mixer device for this stage of the operation is a high shear pin-type mixer with a short residence time such as an Oakes mixer. The preferred blowing agents are conventionally supplied under air or nitrogen pressure to the mixer.

From the mixer the foamable mixture is passed to an extrusion head. Expansion from the head is rapid and results in a stream of foaming material that is deposited on a substrate. The extrusion head may be in the form of a slit so as to lay down a continuous sheet of foam. In a preferred process however the extrusion head is a valved pipe that reciprocates transverse to the direction of extrusion so as to lay down, on a moving substrate, a continuous ribbon of foam in parallel lines that coalesce as foaming proceeds. In a further preferred feature shaping members provide limitations to the expansion and result in the production of a uniform shaped board of the foamed resin.

It is also possible to provide that the shaping members apply to the surface a suitable facing material though it is often more convenient to apply such a facing after expansion is complete and the foam has hardened.

As the foaming proceeds the foam is conventionally held at a constant temperature of about 60° C. This is done by passing the sheet as it is formed through an oven maintained at that temperature such that, as it leaves the oven after about 20 minutes, it has solidified sufficently to be cut into board pieces which are then stored at 60° C. for 18 hours. The boards are then heated to a temperature of at least 90° C. for a time sufficient to ensure that substantially all parts of the board are held at that temperature for about an hour.

After the board has been cured as taught above, it is often desirable to laminate it to a facing material. This may comprise cardboard, asphalt/asbestos composites, aluminum foil plastic vapor barrier or glass fiber sheet meterial that may optionally be resin or asphalt impregnated. These materials may be useful in improving the surface of the foam and in affording some dimensional stability. It should however be noted that the foams of the invention have inherent three dimensional stability and any facing selected to produce a laminate need not be chosen with the problems of dimensional change in mind.

While the process has been described in terms of the production of a continuous sheet it is of course possible to operate on a batch process and produce a single block of foam by extruding the foamable mixture into a mold.

Foam Properties

Since the foam material is primarily useful as an insulating material, it is essential that it provides a good barrier to heat transfer. However it is not sufficient that the fresh foam have good thermal barrier properties: those properties must be retained for a prolonged period after installation.

The thermal insulation characteristics of a closed-cell foam are largely determined by the rate at which heat is transferred through the foam via conduction through the cell skeleton and the gas filling the cells and via radiation through the cell structure. Thus the nature of the gas is a critical element in determining conductivity as is the extent to which it is retained in the cells. It will also be appreciated that stronger and thicker cell windows will be more capable of retaining a more desirable gas composition for a longer period than weaker, thinner windows.

As the foam ages, air diffuses in and blowing agent diffuses out. Since air generally has a much higher thermal conductivity than the blowing agent, the thermal barrier properties are substantially diminished. This is a common experience with most insulating foams and has led to the use of barrier films on the major surfaces to inhibit escape of gas. Such films however lose their utility to a significant extent when punctured.

This decrease in thermal barrier properties takes place gradually but it is found that a useful indicator of long term performance is the thermal conductivity, "k", after 10 days storage at normal atmospheric conditions of 23° C. and 50% R.H. If the cell windows in the foam are fractured or very thin, the blowing agent will have been diluted by sufficient air to increase significantly the value of "k".

The "k" after 10 days referred to in this specification, except as otherwise indicated, is the thermal conductivity ten days after the cure operation that produced the foam of the invention and has been found to be a reasonable indicator of the long term stability of the insulation value of the foam.

Besides the long term "k"-stability, it is desirable that an insulation foam have as low a free formaldehyde content as possible. This is because free formaldehyde, which is known to be an irritant and may be hazardous in fairly modest concentrations, is gradually released from the foam. The formaldehyde can be reduced somewhat by the use of low F/P ratios in preparing the resoles but this can lead to incomplete reaction or even, at the extremes, formation of a novolak. Additionally such foams are often characterized by high exotherms that make a balanced expansion/cure difficult to attain. Alternatively and usually preferably the foam can be heated to cause the formaldehyde to be used up in cross-linking reactions or be driven off. This process however results in great strains on the cell walls, and, in prior art foams, leads to a substantial breakdown in the closed-cell character of the foam. The foams of the invention however have a cell structure that is able to withstand higher temperature cures and thus a greater reduction in releasable formaldehyde without serious loss of insulation value.

The invention is now described with reference to specific compositions which are intended for illustration only. It should not be inferred that they imply any limitation on the scope of the invention.

The closed-cell content was measured by an air pycnometer using the technique described in ASTM D-2856 (Procedure C) to obtain open-cell content, the closed-cell content being 100 minus the open-cell content. The thermal conductivity of the foam was measured using the technique described in ASTM C-518-76 on a sample with a 2.54 cm thickness having at least 20.3 cms of width and length. The top face of the sample was at 32° C. and the bottom at 15.5° C., thereby providing a mean temperature of 24° C. for the entire sample. A heat flow meter thermal conductivity instrument constructed in accordance with such method and available as Rapid-K from Dynatech R/D Co., 99 Erie St., Cambridge, Mass. 02139 was used.

The resole used in each example was dehydrated to below 3% by weight of water and bodied at 50°-60° C. for a time sufficient to provide the desired viscosity which was measured using a Brookfield Vicometer Model HBT. Since viscosity variation with temperature is significant a Brookfield thermocell was used for the resoles of the examples following hereinafter which comprised a thermo container along with an SCR controller, Model HT-64, and SC4-27 spindle and an HT-2 sample container. Measurements were made at 25° C. All viscosities given were obtained by this technique.

The burst pressure of the cells of any particular foam was determined by measuring the closed-cell content of a foam sample, then placing that sample in a pressure tube and applying a small incremental isotropic pressure. After being subjected to that pressure for five minutes the closed-cell content was remeasured. The sample was then replaced in the tube an depressurized at a slightly higher isotropic pressure for five minutes before being measured for closed-cell content again. This procedure was repeated at ever higher pressures and a graph was plotted of closed-cell content against pressure. It was found that, at a characteristic isotropic pressure for each foam, the closed-cell content dropped dramatically by at least 10% and continued to drop thereafter. This pressure is called the "burst pressure".

Density was calculated from an accurately weighed 3.6 cms diameter, 2.9 cms long core sample.

EXAMPLE 1

This Example illustrates the production of foams according to the invention.

The following components were mixed together using a high shear short residence, pin-type mixer supplied by Oakes Machinery Co. and commonly called an "Oakes mixer".

| Resole A (1) | F/P ratio 1.89:1 | 96 parts |
|---|---|---|
| | Viscosity at 25° C. | 100,000 cps |
| Blowing Agent | Freon 114 (2) | 16.5 parts |
| Surfactant | DC-193 (3) | 4 parts |
| Foaming Catalyst | (4) | 2.24 parts |
| | All Parts Being By Weight | |

(1) RI-5100 (Monsanto Co.) a resole containing a dispersed oxalate salt as a result of the neutralization of the calcium hydroxide catalyst using oxalic acid.
(2) A flurocarbon (1,2-dichloro-tetrafluoroethane) available from DuPont Co. under that description.
(3) A silicone based surfactant available from Dow Corning Co. under that designation.
(4) A 2:1 (wt. ratio) blend of diethylene glycol and Ultra TX acid, (a mixture of toluene and xylene sulfonc acids available from Witco Chemical Co. under that trade designation), expressed in terms of acid component content.

The blowing agent was supplied under air pressure and the resulting formulation was passed directly to an extrusion head in the form of a nozzle fitted with a torpedo valve to control the rate of expansion of the foamable mixture from the head.

The temperature of the mixture at the extrusion head was between 40° and 42° C. and the pressure at the valve was kept at 3.74 to 4.42 atmospheres.

The extrusion head was reciprocated in such a way as to lay down a continuous ribbon of the foaming mixture on a moving sheet of Kraft paper. The mixture was deposited in essentially parallel lines forty centimeters in length such that, as foaming occurred, the lines coalesced to form a continuous sheet.

The foam was allowed to stand at 60° C. for about 10 minutes at which time it had hardened sufficiently, to be cut using a saw into convenient pieces. Those pieces were then stored at 60° C. for 18 hours.

Samples 1-A through 1-G were taken from different parts of the foam sheet produced by the above process and were tested for density, closed-cell content and thermal conductivity (2.54 inches thick) initially ($k_1$) and after 100 days ($k_{100}$). The results are set forth in Table 1.

TABLE 1
FOAM PROPERTIES

| Sample (A-G Invention) | Density (kg/m$^3$) | Initial closed-cell (%) | Burst Pressure (kg/cm$^2$) | Thermal Conduct. (watt/m °C.) $k_1$ (Initial) | $k_{100}$ (100-days) | $\frac{\Delta k}{\Delta \ln t} \times 10^{3}$* |
|---|---|---|---|---|---|---|
| 1-A | 47.9 | 94.2 | 2.81+ | .0161 | .0164 | .065 |
| 1-B | 47.9 | 90.7 | 2.81+ | .0161 | .0164 | .065 |
| 1-C | 47.9 | 92.4 | 2.81+ | .0161 | .0164 | .065 |
| 1-D | 47.9 | 94.6 | 2.81+ | .0161 | .0164 | .065 |
| 1-E | 47.9 | 95.1 | 2.81+ | .0161 | .0164 | .065 |
| 1-F | 47.9 | 91.1 | 2.81+ | .0161 | .0164 | .065 |
| 1-G | 48.2 | 95.0 | 2.74 | .0161 | .0164 | .065 |

*$\Delta k$ is $k_{100} - k_1$ and $\Delta \ln t$ is $\ln t_{100} - \ln t$

The above results show that high burst pressure is associated with good retention of low thermal conductivity values.

Thereafter sample cylinders of 3.6 cm. diameter and 2.9 cm. length taken from samples 1-A through 1-G for which data is presented above were treated to a variety of further cure operations described under "Cure Conditions" in Table 2 following. The thus cured samples were weighed and measured and then as a test for dimensional stability, such cured samples were further heated at 90° C. for 1 hour. After that they were cooled and again weighed and measured to determine any permanent changes in weight or dimension. Measurement of dimensional change was done mechanically with a machinist's outside vernier caliper with an accuracy of about ±0.1%.

The results are set forth in Table 2.

TABLE 2
DIMENSIONAL STABILITY

| Sample | Cure Conditions | % Change In Mass And Dimensions After Additional 1 Hr. @ 90° C.* | | |
|---|---|---|---|---|
| | | Mass | Diameter | Length |
| 1 | 18-Hr. @ 60° C. | −2.1 | −0.3 | −0.2 |
| 2 | 18-Hr. @ 60° C.+ 2-Hr. @ 90° C. | −0.2 | 0.0 | 0.0 |
| 3 | 18-Hr. @ 60° C.+ 2-Hr. @ 105° C. | −0.1 | 0.0 | 0.0 |
| 4 | 18-Hr. @ 60° C.+ 2-Hr. @ 120° C. | +0.1 | 0.0 | 0.0 |

*Change based on mass and dimensions before such additional 1 hour.

The above samples 1 through 4 had an average closed-cell content after heating for 18 hours at 60° C. of 95.2%.

Samples 2 through 4 illustrate the invention and Sample 1 illustrates the effect of the low cure taught in the prior art. As can be seen the foams of samples 2 through 4 according to the invention show zero dimensional change and less than ½% loss in their mass as a result of the heating. The mass increase in sample 4 is believed due to weighing the sample initially while at elevated temperature and containing low atmospheric moisture versus the greater moisture in the samples when weighed after the test at lower room temperature.

EXAMPLE 2

This Example illustrates the use of a resole having an F/P ratio of 1.6:1 to produce a foam according to the invention.

The resole was a dispersed salt resole of the same type used in Example 1 made at the lower F/P ratio. As before the resole was dehydrated to below 3% by weight of water and bodied to a viscosity of 106,000 centipoise.

The surfactant, blowing agent and catalyst used were those described in Example 1 and the weight proportions were as follows:

pressure at the torpedo valve was kept at 3.1 to 4.1 atmospheres. The results are set forth in Table 4.

TABLE 4

PROPERTIES OF CURED FOAMS

| Sample No. | Cure Conditions | Density (kg/m$^3$) | Thermal Conductivity watts/m °C. | | | Closed Cell % |
|---|---|---|---|---|---|---|
| | | | (Initial) $k_1$ | (After) (10-Days) $k_{10}$ | (After) (100 Days) $k_{100}$ | |
| 1 | 18-Hrs. @ 60° C. | 44 | .0161 | .0161 | .0164 | 92.4 |
| 2 | 18-Hrs. @ 60° C. +2-Hrs.@ 90° C. | 43 | .0164 | .0164 | .0171 | 91.0 |
| 3 | 18-Hrs. @ 60° C. +2-Hrs @ 105° C. | 49 | .0160 | .0163 | .0187 | 93.7 |
| 4 | 18-Hrs. @ 60° C. +2-Hrs. @ 120° C. | 42 | .0160 | .0173 | .0230 | 90.0 |

| | |
|---|---|
| Resole | 96 parts |
| Blowing Agent | 16.5 parts |
| Surfactant | 4 parts |
| Foaming Catalyst | 1.54 parts (expressed in terms of the acid component of the catalyst) |

The components were mixed, foamed and the foam stored at 60° C. for 18 hours exactly as shown in Example 1 except that the viscosity of the resole was 106,000 cps at 25° C. and the temperature in the extrusion head was 49.2° C.

When a sample of the partially cured foam thus produced was evaluated in the same manner as the foams produced in Example 1 it was found that the foam had a density of 39.4 kg/m$^3$, a closed-cell content of 91.6%, a $k_1$ of about 0.0181 watts/m° C., a $k_{10}$ of 0.0184 watts/m° C. and a burst pressure of 2.46 kg/cm$^2$.

The foams were then given a variety of further cures and the dimensional stability was determined as described in Example 1. The results are set forth in Table 3.

TABLE 3

DIMENSIONAL STABILITY

| Sample | Cure Conditions | % Change In Mass And Dimensions After Additional 1 Hr. @ 90° C.* | | |
|---|---|---|---|---|
| | | Mass | Diameter | Length |
| 1 | 18-Hrs. @ 60° C. | −2.1 | 0.0$^{(1)}$ | −0.3 |
| 2 | 18-Hrs. @ 60° C.+ 2-Hrs. @ 90° C. | −0.4 | 0.0 | 0.0 |
| 3 | 18-Hrs. @ 60° C.+ 2-Hrs. @ 105° C. | −0.4 | 0.0 | 0.0 |

$^{(1)}$This may be an anomaly explained by the sensitivity of the measurement technique.

The samples 1 to 3 after the 18 hours at 60° C. treatment had an average closed-cell content of 95.2% and a burst pressure of 2.46 kg/cm$^2$.

Samples 2 and 3 illustrate the invention, while 1 illustrates the effect of the low cure taught in the prior art. As can be seen the foams according to the invention show zero dimensional change and less than ½% loss in their mass as a result of the heating.

EXAMPLE 3

This Example details properties including the thermal conductivities of various foams produced from the formulations of Example 1 except that: the viscosity of the resole was 125,000 cps, the levels of Freon 114 and foaming catalyst used were 13.5 to 16.5 parts and 1.5 to 1.9 parts respectively, the temperature of the mixture at the extrusion head was between 55° and 60° C. and the From the table it can be seen that a high closed-cell content survives the high temperature cure and that a good thermal conductivity is retained. The drift of k, even in the highly cured state remains remarkably low.

EXAMPLE 4

This Example details the performance of a closed-cell phenolic foam of unknown formulation and unknown cure history but apparently superior performance from the point of view of stability to elevated temperatures. The foam of this Example was received form a third party on Sep. 18, 1978 and was believed formed according to the disclosure of U.S. Pat. No. 4,303,578. A sample of such foam tested just after receipt by the procedure described in Example 1 had a density of 37.5 kg/m$^3$ and a closed-cell content of 92.4%. Its thermal conductivity without any further thermal conditioning 6 days after receipt was 0.016 watts/m° C.

Four samples of this foam as received were subjected to the heating conditions specified in Table 5 and the closed-cell content was measured after each heat treatment. Time in the pyncnometer was 5 minutes. A time interval of one month occurred between testing the foam as received and exposure to the cure conditions recited in Table 5.

TABLE 5

| | | Cure Conditions | | | |
|---|---|---|---|---|---|
| Temperature | As Received | 60° C. | 80° C. | 100° C. | 120° C. |
| Time | | 1-Hr. | 1-Hr. | 1-Hr. | 1-Hr. |
| Closed-Cell Content | 92.4% | 90.5% | 88.2% | 65.2% | 19.2% |

This is assumed to be a dramatic confirmation of the teaching contained for example in U.S. Pat. No. 4,303,578 that phenolic foams should not be heated above 100° C. and preferably not above 80° C. if good insulation qualities are to be retained. It also demonstrates that this prior art foam would lose its insulation effectiveness when installed in a roof structure exposed to normally elevated temperatures.

By contrast it has now been shown possible to obtain closed-cell foams of great strength that can withstand the elevated temperatures necessary to confer dimensional stability without significant loss of closed-cell content. The behavior of one sample of foam produced by the process substantially as described in Example 1, when successively treated in a manner even more severe than that to which the prior art foam was exposed is shown in Table 6 below. The process conditions in forming the foam of this Example differed from those of Example 1 in that 96 parts of a resole were used which had a viscosity of 300,000 cps and an F/P ratio of 2.12:1 and 15.5 parts and 2.07 parts respectively of Freon 114 and foaming catalyst were used in the foaming composition. The temperature of the mixture at the extrusion head was between 60° And 70° C. and the pressure at the torpedo valve was kept between 4.0 and 5.0 atmospheres.

TABLE 6

| Temperature | Initial Cure 60° C. | Post Cure 120° C. | 120° C. |
|---|---|---|---|
| Time | 18-Hrs. | 2-Hrs. | 8-Hrs. |
| Closed-Cell Content | 94.3% | 93.5% | 93.5% |

Other samples of foams according to the invention produced by the process of Example 3 with various subsequent cure histories had closed-cell contents that varies on heating as shown in Table 7.

TABLE 7

| | | Closed-Cell Content | | | |
|---|---|---|---|---|---|
| Sample | Initial Cure (Hr./ Temp. °C.) | Initial | After Further 2-Hrs. @ 90° C. | After Further 2-Hrs. @ 120° C. | After Further 2-Hrs. @ 150° C. |
| 1 | .167/60° C. | 93.2 | 92.1 | 90.6 | 92.5 |
| 2 | 0.5/60° C. | 91.6 | 89.1 | 89.6 | 86.7 |
| 3 | 2.0/60° C. | 93.3 | 91.4 | 91.9 | 89.5 |
| 4 | 6.0/60° C. | 91.1 | 90.2 | 89.8 | 88.0 |
| 5 | 18/60° C. | 92.9 | 90.5 | 91.1 | 88.9 |

The anomalous increases in closed-cell content with increasing intensity of cure conditions is not understood but believed possibly due to test accuracy.

This demonstrates very clearly that the foams described above are able to withstand temperatures up to 150° C. without substantial disruption of the closed-cell structure. The above samples of this Example 4 exhibit less than 5% reduction in closed-cell content after the 150° C. exposure versus the initial level.

EXAMPLE 5

This Example details the change of cure ratio with the cure conditions to which the foam has been exposed. The measurement technique used is that described in "Macromolecules" 1980 Vol. 13 pp. 1320-1322 and the cure ratio is defined as the ratio of $-CH_2-$ groups per ring structure in the foam.

To calculate the cure ratio from the $^{13}C$-NMR analysis it is assumed that no formaldehyde is lost during cure and that the initial nominal combined F/P ratio of the resole accounts for all of the components analyzed by $^{13}C$-NMR. For example:

For a sample of foam pre-cured at 60° C. for 18 hours and made from a resole having a nominal F/P ratio of 2.0, a value of 1.85 was obtained from $^{13}CNMR$ for the ratio $CH_3O/CH_2$. From the F/P ratio there are 2 $CH_2O$ molecules per ring.

$$CH_3O + CH_2 = 2.0$$
$$CH_3O/CH_2 = 1.85$$
$$1.85 CH_2 + CH_2 = 2.0$$
$$CH_2 = 0.702$$

"$CH_2$" and "$CH_3O$" above in this Example 5 mean methylene and methylol linkages respectively.

The foams used were prepared by the processes described in Examples 1 and 2. For the sake of comparison, the prior art foam of Example 4 (Table 5) was also noted.

The results are set forth in Table 8.

TABLE 8

| Resole/Foam | Cure | Cure Ratio |
|---|---|---|
| Example 4 (Table 5) As Received | Unknown | 0.555 |
| Example 1 | Resin - Unfoamed | 0.190 |
| Example 1 | 18-Hrs. @ 60° C. | 0.702 |
| Example 1 | 18-Hrs. @ 60° C. +2-Hrs. @ 105° C. | 0.833 |
| Example 1 | 18-Hrs. @ 60° C. +8-Hrs. @ 105° C. | 0.960 |
| Example 2 | Resin - Unfoamed | 0.190 |
| Example 2 | 18-Hrs. @ 60° C. | 0.940 |
| Example 2 | 18-Hrs. @ 60° C. +2-Hrs. @ 120° C. | 1.150 |

From this together with the data in Table 2, it can be inferred that the Example 1 foam (nominal F/P 2:1) is adequately cured for dimensional stability (i.e. at a temperature of about 90° C. for at least one hour) at a cure ratio of about 0.75–0.80 whereas for the Example 2 foam (nominal F/P 1.6:1) dimensional stability is achieved at a cure ratio of about 1.0. The prior art foam of Example 4, though it has a good thermal conductivity ($k_6 = 0.016$ watts/m° C.), has a low cure ratio and this probably accounts for the poor retention of closed-cell content on heating to about 90° C.

EXAMPLE 6

This Example details an accurate test of dimensional changes after a foam is heated to 90° C. and held there for a prolonged period. This is a more stringent dimensional change test than described in Example 1.

Two foam samples were obtained in the form of square blocks 2.54 cm. high and 10.16 cm. in width-/length. The foaming process was as for Example 1 except that F/P ratio was 2.04:1, viscosity was 78,500 cps, Freon 114 and foaming catalyst were 16.0 and 2.18 parts respectively, temperature at the extrusion head was 55° to 65° C. and the torpedo valve pressure was 4.5 to 5.5 atmospheres.

Both samples were partially cured for 18 hours at 60° C. and then one sample was further cured for two hours at 90° C. The dimensions of the samples were than accurately measured using a liner variable displacement transducer (LVDT) with a measurement accuracy of ±0.1%. The samples were then placed in a constant temperature enclosure maintained at 90° C. and left there for about 24 hours. It is estimated that complete temperature equilibrium existed through the samples for at least 20 hours.

The change in dimensions of the samples versus the dimensions after cure and prior to the 24 hours at 90° C. was followed and the following results were obtained.

TABLE 9

| | DIMENSIONAL STABILITY | |
|---|---|---|
| | Height % Change | Width % Change |
| Comparative (18-Hrs.) (at 60° C.) | −0.43% | −0.77% |
| Invention (18-Hrs.) (at 60° C.) (+2-Hrs.) | +.07% | −0.21% |

TABLE 9-continued

DIMENSIONAL STABILITY

| | Height % Change | Width % Change |
|---|---|---|
| (at 90° C.) | | |

From the above it can be seen that the foam given the additional cure at 90° C. changed very substantially less than the other especially in the height dimension.

In practical terms a board according to the invention one meter long and 5 cm. thick, would show a 0.035 mm height increase and a shrinkage of 0.21 cm. such that only a 2 mm gap would develop between adjacent boards. By contrast a foam board partially cured according to the comparative sample above would shrink in height by 0.22 mm and in length by 7.7 mm. Thus a gap between adjacent boards of over ⅜ cm. would develop.

Both foams had closed-cell contents of 90%, and a thermal conductivity twenty-nine days after the 90° C. 24 hours exposure of 0.018 watts/m° C. The thermal conductivity after ten days can therefore be estimated to be less than 0.018 watts/m° C.

EXAMPLE 7

This Example further illustrates the use of a resole having a nominal F/P ratio of 2:1 to produce a foam according to the invention. All parts are by weight.

The following components were mixed together using a jacketed, continuous mixer, Model 4MHA available from Oakes Machinery Co., 235 Grant Ave., Islip, N.Y. 11751.

| Resole | F/P ratio 1.93:1 (1) | 96 parts |
|---|---|---|
| | Viscosity at 25° C. | 263,000 cps |
| Blowing Agent | Freon 114 (2) | 15 parts |
| Surfactant | DC-193 (3) | 4 parts |
| Foaming Catalyst | (4) | 2.2 parts |

(1) The liquid resole contained a dispersed oxalate salt as a result of the neutralization of calcium hydroxide catalyst using oxalic acid. The F/P ratio was obtained by nuclear magnetic resonance (NMR) analysis described previously.
(2) A fluorocarbon (1,2-dichloro-tetrafluroethane) available from DuPont under that description.
(3) A silicone based surfactant available from Dow Corning Co. under that description.
(4) A 2:1 weight ratio blend of diethylene glycol and Ultra TX acid which is a mixture of toluene and xylene sulfonic acids available from Witco Chemical Co. under that trade designation, expressed in terms of acid component content.

The blowing agent was held in a bomb-like container and saturated with air by bubbling air at about 15 atmospheres into it for about 4 to 6 hours. This was to promote uniform nucleation of the blowing agent on reduction of the pressures during a subsequent phase of the foaming process.

The resole, stored at about 5° C. to minimize advancement, was initially brought to room temperature (25° C.) and a laboratory test for reactivity performed thereon. This test was run at three acid levels (for Example 1, 1.5 and 1.8% acid as described in (4) above and based on resole weight) in order to measure the sensitivity of the resole reactivity to acid level. 150 grams of the resole and 3 grams of the DC-193 surfactant were charged to a 1 pint paper cup and mixed for one minute with a high speed mixer (720 rpm). 22.5 grams of Freon 13 blowing agent were then added and the contents mixed for an additional minute. The acid catalyst solution of toluene sulfonic acid and diethylene glycol was then added and mixed for an additional 30 seconds. 100 grams of the mixed formulation was quickly charged to a cylindrical cell about 5.7 cms high and 20.3 cms diameter fitted with a thermocouple attached to a recorder. The capped cell was placed in an oven set at 60° C. and the peak temperature and time to reach same noted. The reactivity number, defined as the rate of temperature rise between the oven temperature and the peak temperature reached by the foaming composition, has the dimensions ° C./minute and was calculated at 3.2° C./minute. This number is dependent on a number of resole characteristics —e.,. F/P ratio, water content, molecular weight, etc. and can therefore vary widely. Resoles with reactivity numbers of between about 2 to about 12 and preferably between 3 to 7 at a concentration of acid catalyst of 1.5% have been used. If the reactivity number is too high, water is added to the particular resole to reduce it whereas if the reverse is true the acid concentration is adjusted upwardly.

The resole and surfactant were initially mixed together at about 25°-40° C. in a jacketed, paddle mixer for about 30 minutes under an absolute pressure of 5 mm. of mercury to avoid entraining air. The resole and surfactant, foaming catalyst and blowing agent were continuously charged to the Oakes mixer in the foregoing noted ratios through suitable flow metering devices. Turbine meters obtained from Flow Technology Inc., Sacramento, Calif. were used on the Freon and an oval gear meter obtained from Brooks Instrument Division of Emerson Electric was used on the resole-surfactant acid-catalyst streams. The Oakes mixer was operated at about 93 rpm and had tempered water at about 40° C. flowing through its jacket. The charge line carrying the resole was traced with hot water at about the same temperature. The blowing agent and catalyst were metered to the mixer at 25° C. The temperatures of the foam composition entering the mixer was about 30°-40° C. while at the discharge of the mixer it was about 45°-50° C. The pressure in the mixer was 6.8 atmospheres. The temperature increase in the high shear mixer should be minimized to limit reaction therein which tends to foul the mixer. Likewise the pressure in the mixer should be above the vapor pressure of the foaming agent to avoid premature foaming and with the Freon 114 of this Example, such pressure should be kept at between about 3.4–6.8 atmospheres.

The resulting formulation passed from the mixer through a finite length of insulated transfer tube consisting of a 91 cms long by 1.27 cms diameter pipe where foaming commenced, to an extrusion head in the form of a 0.64 cm diameter nozzle just upstream of which was a bladder torpedo-control valve (Tube-O-Matic Valve B-310208 available from Schrider Fluid Power Inc., P.O. Box 1448-71 Woodland St., Manchester, Conn. 06040). This air pressure controlled valve controlled the back pressure in the mixer and delivery tube and the rate of expansion of the foamable mixture issuing from the head. The mass flow rate of the foaming composition through the system was about 430–440 gms/minute.

The temperature of the mixture at the nozzle was 49° C. while the pressure there was 0.68 atmospheres; the pressure at the inlet to the control valve was 3.9 atmospheres whereas the temperature at such inlet was 50.9° C.

The extrusion head was reciprocated through about 55.9 cms in 2–4 seconds in such a way as to lay down a continuous ribbon of the foaming mixture on a sheet of natural Kraft paper 0.254 mm. thick having a weight of 205 kg/1000m² advancing at the rate of about 24.4 cms/min.

The distance of the nozzle from the moving paper was kept at a minimum to minimize entrainment of air.

The mixture was deposited in essentially parallel lines such that as foaming occurred the lines coalesced to form a continuous sheet. In this regard, the nature of the foam deposited on the moving paper web is a function of the pressure drop across the control valve. If the pressure upstream of the valve is too high a soupy deposit is obtained which results in discernible knit lines at the juncture of the ribbon-like formations issuing from the head which eventually produce undesirable large cells along such knit lines. On the other hand if such pressure is too low shearing of the foam in the control valve and delivery tube occurs which means that the cells are ruptured and the blowing agent escapes. The stream issuing from the nozzle should have the consistency of a froth such that rapid expansion without significant entrapment of air occurs as the composition is deposited on the paper substrate.

Immediately downstream of the extrusion nozzle a protective Kraft paper covering was applied to the upper surface of the advancing foam sheet. Such covering (same characteristics as the paper substrate) passed around a fixed roller about 30.5 cms beyond the nozzle into contact with the rising developing foam sheet. The covered foam sheet was then brought into forcible compressive engagement with a succession of six immediately adjacent 3.8 cms diameter freely floating steel rolls interposed across the path of the advancing foam in order to iron out any irregularities in the foam surface and promote good wetting by the foam of the protective upper paper layer. The rollers serve to exert a constant pressure on the advancing foam and were vertically positioned so as to come into contact with about the upper 0.64 cms of thickness. This is important since warping of the foam product can occur in the absence of good adhesion with the top and bottom paper layers brought about by such compressive rolling contact.

The foam sheet covered on its upper and lower faces with the Kraft paper was then passed through a hot air curing tunnel in the form of an oven obtained from Kornylak Co., 400 Heaton St., Hamilton, Ohio, described as a 25 foot Air Film Principle Foam Containment Conveyor. This tunnel oven consisted of a section about 7.6 m long having a succession of five pairs of perforated platens vertically spaced 15.2 cms apart, one of each pair of which was above and below the advancing foam and each of which was about 1.5 m long. A film of hot air controlled at 53° C. issued from the first pair of platens closest to the extrusion nozzle against the paper-covered upper and lower surfaces of the foam. A succession of about eight 3.8 cms diameter, immediately adjacent floating rollers were also in the oven under the first platen for contact with the covered upper surface portion of the foam sheet. Air issuing from the remaining platens was kept at temperatures in the range of about 45°-55° C. The residence time of the foam in such oven was about 31 minutes at which time it had been hardened sufficiently to be cut with a saw into convenient pieces. These pieces were then stored at 60° C. for 18 hours.

Periodically (about once every 30 minutes) a thermocouple was inserted into the foam adjacent the extrusion nozzle and allowed to travel down the tunnel to measure the internal temperature of the foam formulation. The peak exotherm temperature was maintained at about 60°-65° C. and was controlled by adjusting the temperature of the hot air in the curing oven and/or the acid curing catalyst concentration in the mixture.

Sample 9-1 was taken from the foam sheet being continuously produced by the foregoing process and was tested as previously described for density, closed-cell content, burst pressure and thermal conductivity after ten and 100 days. During aging prior to thermal conductivity testing, samples were stored at 73° F. (23° C.) and 50% relative humidity. The results are set forth in Table 10 following.

TABLE 10

EXAMPLE 7 - FOAM PROPERTIES
After Initial Partial Cure Of 18 Hrs. @ 60° C.

| Sample | Density kg/m³ | Burst Pressure kg/cm² | Closed-Cell (%) | $k_{10}$ w/m °C. | $k_{100}$ w/m °C. |
|---|---|---|---|---|---|
| 9-1 | 47.4 | 2.32 | 97.9 | 0.0165 | 0.0169 |

One part of the partially cured product having the properties set forth above in Table 10 was then exposed further to one hour at 90° C. and the mass and dimensional changes measured with respect to those prior to such additional 1 hour at 90° C. Samples for such dimensional stability testing were of the size noted in Example 1 and measurements for such stability testing were made with a caliper as identified in Example 1. Results are set forth in Table 11 following.

TABLE 11

| | After 1 Hour Further @ 90° C. | | |
|---|---|---|---|
| Sample | Mass Change % | Height Change % | Diameter Change % |
| 9-2 | −2.4 | −0.5 | −0.4 |

Another part of the partially cured product described in Table 10 was post cured for two hours at 90° C. allowed to return to ambient temperature, then exposed to one additional hour at 90° C. and its mass and dimensional changes measured after such additional one hour at 90° C. with respect to those prior to such additional 1 hour but after such post cure. Other properties were also measured. Results are are set forth in Table 12 following.

TABLE 12

| | Two Hours Post Cure @ 90° C. Plus 1 Hr. @ 90° C. | | | | | |
|---|---|---|---|---|---|---|
| Sample | Closed-Cell % | $k_{10}$ w/m °C. | Density kg/m³ | Mass Chg. % | Height Chg. % | Diameter Chg. % |
| 9-3 | 98.3 | 0.0167 | 46.3 | −0.25 | 0 | 0 |

The above data illustrated dimensionally stable foam according to the invention which after post curing at the conditions stated in Table 12 had (i) a density of between 30 to 70 kg/m³, (ii) a closed-cell content in excess of 85%, (iii) a k value ten days after such post cure of less than 0.0185 watts/m° C. and (iv) a change of less than 0.1% in either height or diameter. The partially cured initial foam as set forth in Table 10 from which the foam having the properties in Table 12 was prepared had (v) a burst pressure of at least 1.75 kg/cm$^2$ and (vi) a k retention defined as the value of the expression $k_{100}-k_1/\Delta \ln t$ from time (t)=1 to t=100 of less than $0.5\times 10^{-3}$ when k is measured in watts/m° C. The values in Table 11 illustrates the performance of foam which has not been subject to a high temperature post cure operation.

What is claimed is:

1. A method for producing a rigid, closed cell, phenolic resin foam comprising:
   (a) forming a partially expanded froth foam of a resole resin containing at least one easily vaporisable blowing agent, a polymerization catalyst and a surfactant;
   (b) further expanding and curing the froth foam to provide a rigid foam;
   (c) cutting the rigid foam into board pieces; and
   (d) hardening the rigid foam board pieces by subjecting them to a degree of cure substantially equivalent to the degree of cure achieved by heating to a temperature of about 60° C. for about 18 hours.

2. The method of claim 1 wherein the hardened rigid foam product possesses a closed cell content of at least 85%.

3. A method for producing a rigid, closed cell, phenolic resin foam possessing dimensional stability at elevated temperatures, comprising:
   (a) forming a partially expanded froth foam of a resole resin containing at least one easily vaporisable blowing agent, a polymerization catalyst and a surfactant;
   (b) further expanding and curing the froth foam to provide a rigid foam;
   (c) cutting the rigid foam into board pieces;
   (d) hardening the rigid foam board pieces by subjecting them to a degree of cure substantially equivalent to the degree of cure achieved by heating to a temperature of about 60° C. for about 18 hours; and
   (e) subjecting the hardened rigid foam to a temperature of at least about 90° C. for at least about 1 hour.

4. The method of claim 3 wherein the hardened rigid foam product possesses a closed cell content of at least 85%.

* * * * *

UNITED STATES PATENT AND TRADEMARK OFFICE
CERTIFICATE OF CORRECTION

PATENT NO.  :   5,234,969
DATED       :   August 10, 1993
INVENTOR(S) :   Robert C. Clark and Dean L. Kavanagh It is certified that error appears in the above-identified patent and that said Letters Patent is hereby corrected as shown below:

On the title page, item (63) Related U.S. Application Data should read --

Continuation of Ser. No. 925,524, Oct. 28, 1986, which is a
continuation of Ser. No. 571,885, Jan. 18, 1984, which is a
continuation of Ser. No. 520,364, Aug. 4, 1983, abandoned,
which is a continuation of Ser. No. 365,921, Apr. 8, 1982,
abandoned, which is a continuation-in-part of Ser. No. 265,277,
May 20, 1981, abandoned.

--.

Signed and Sealed this

Seventh Day of June, 1994

Attest:

BRUCE LEHMAN

Attesting Officer

Commissioner of Patents and Trademarks